(12) United States Patent
Salice

(10) Patent No.: US 8,468,652 B2
(45) Date of Patent: Jun. 25, 2013

(54) DECELERATING DEVICE

(75) Inventor: Luciano Salice, Carimate (IT)

(73) Assignee: Arturo Salice S.p.A. (IT)

( * ) Notice: Subject to any disclaimer, the term of this patent is extended or adjusted under 35 U.S.C. 154(b) by 22 days.

(21) Appl. No.: 13/264,691

(22) PCT Filed: Mar. 24, 2010

(86) PCT No.: PCT/EP2010/053810
§ 371 (c)(1),
(2), (4) Date: Dec. 30, 2011

(87) PCT Pub. No.: WO2010/118934
PCT Pub. Date: Oct. 21, 2010

(65) Prior Publication Data
US 2012/0110914 A1    May 10, 2012

(30) Foreign Application Priority Data

Apr. 15, 2009  (IT) .............................. MI2009A0607

(51) Int. Cl.
*E05F 5/02* (2006.01)
*E05F 3/22* (2006.01)

(52) U.S. Cl.
USPC ..................... 16/82; 16/54; 16/286

(58) Field of Classification Search
USPC ................ 16/82, 85, 86 R, 86 A, 51, 54, 286,
16/281, 374, 375; 188/266, 281, 283–285,
188/288, 287, 282.1, 282.6, 282.8, 316, 317,
188/318, 322.5, 322.19, 322.15; 267/64.14,
267/64.15, 195, 202, 209, 212, 213, 226;
312/319.1, 319.2, 333, 330.1, 334.44, 334.46,
312/334.47
See application file for complete search history.

(56) References Cited

U.S. PATENT DOCUMENTS

| | | | | |
|---|---|---|---|---|
| 1,966,956 A | * | 7/1934 | Dunn | ................ 16/84 |
| 3,628,638 A | * | 12/1971 | Curchack | ............... 188/312 |
| 4,110,868 A | * | 9/1978 | Imazaike | ............. 16/84 |

(Continued)

FOREIGN PATENT DOCUMENTS

| | | |
|---|---|---|
| DE | 10222940 C1 | 7/2003 |
| EP | 1098108 A2 | 5/2001 |
| EP | 1098108 A3 | 5/2001 |
| WO | 2006054994 A | 5/2006 |

OTHER PUBLICATIONS

International Search Report dated Jun. 4, 2010 of PCT/EP2010/053810.

(Continued)

*Primary Examiner* — Chuck Y. Mah
(74) *Attorney, Agent, or Firm* — Amster, Rothstein & Ebenstein LLP

(57) ABSTRACT

A decelerating device (1) comprises a cylinder (2) filled with a fluid, a bushing (3) for the closure of the cylinder (2) traversed by a rod (4) sliding in the cylinder (2), and a piston (5) guided to slide inside the cylinder (2) and fitted with means (7) for the calibrated through passage of the fluid, the piston (5) is separate from the rod (4) and there are also first elastic means (8) for the movement of the piston (5) in the direction of extraction from the cylinder (2) and second elastic means (9) independent of the first elastic means (8} for the movement of the rod (4) in the direction of extraction from the cylinder (2).

9 Claims, 2 Drawing Sheets

U.S. PATENT DOCUMENTS

| | | | | |
|---|---|---|---|---|
| 4,284,177 | A * | 8/1981 | Domek | 188/280 |
| 4,601,502 | A * | 7/1986 | Van Dyke | 292/252 |
| 5,157,806 | A * | 10/1992 | Wartian | 16/66 |
| 5,169,131 | A * | 12/1992 | Shimura | 267/221 |
| 5,620,066 | A * | 4/1997 | Schuttler | 188/300 |
| 5,720,369 | A * | 2/1998 | Thorn | 188/300 |
| 6,615,450 | B2 * | 9/2003 | Salice | 16/85 |
| 6,802,408 | B2 * | 10/2004 | Krammer | 188/322.15 |
| 6,814,193 | B2 * | 11/2004 | Grundei | 188/322.15 |
| 7,100,907 | B2 * | 9/2006 | Fitz et al. | 267/64.15 |
| 7,299,907 | B2 * | 11/2007 | Ferkany | 188/286 |
| 7,657,970 | B2 * | 2/2010 | Artsiely | 16/85 |
| 2006/0118371 | A1 * | 6/2006 | Zimmer et al. | 188/280 |
| 2009/0119873 | A1 * | 5/2009 | Bassi | 16/84 |
| 2010/0263975 | A1 * | 10/2010 | Vallance et al. | 188/322.18 |

OTHER PUBLICATIONS

Written Opinion of the International Searching Authority of PCT/EP2010/053810.

* cited by examiner

DECELERATING DEVICE

BACKGROUND OF THE INVENTION

The present invention relates to a decelerating device, particularly for the moving part of a cabinet, comprising a cylinder filled with a fluid, preferably viscous, a rod sliding by means of a bushing for the closure of said cylinder and a piston sliding inside the cylinder and fitted with means for a calibrated through flow of the fluid.

European patent EP 1162 338 describes a decelerating device in which the head of the rod rests on the piston and, when actuated by an external force, pushes it towards the bottom of the cylinder. Resetting is obtained by means of a spring which actuates the piston in the direction of extraction, which in turn pushes the rod. The speed of extraction of the rod depends therefore on the force of the spring and on the viscosity of the fluid contained in the cylinder that flows through the piston.

In other known decelerating devices of this type, in which the rod is joined to the piston, the aim is that a slow braking stroke, in the direction of introduction of the piston, is followed by a fast return of the same, so that the moving part associated to the device, for example a draw that is braked in the direction of closing, is not instead equally hindered in the inverse movement of opening. This implies the adoption of devices with unidirectional valves on the piston, which complicate its production and make the device more costly.

German patent DE-OS 22 56 201 describes a decelerating device in which the reset spring is placed on the outside of the cylinder between the same and the front end of the piston rod. A second spring, placed inside the cylinder, has the sole function of regulating the change in compensation volume due to the introduction of the rod inside the cylinder and does not assist the movement of the same in any way.

SUMMARY OF THE INVENTION

The technical task of this invention is to provide a decelerating device that overcomes the inconveniences demonstrated by known decelerating devices.

As part of this technical task, one objective of this invention is to create a decelerating device of the type described above, in which the piston rod, acting as a pusher, has a fast return regardless of the movement of the piston, making the adoption of unidirectional flow devices on the same superfluous.

Another task of the invention is to create a device that can act as a decelerating device in one direction and a pushing device in the opposite direction.

Another objective of the invention is obviously to provide a decelerating device that can be produced simply and economically.

Last, but not least, another objective of this invention is to provide a method for the extremely smooth and silent opening and closing of the moving part of a cabinet.

The technical task, as well as these and other objectives, according to this invention, are achieved by designing a decelerating device and an opening and closing method in accordance with the claims reported hereafter.

One particularly advantageous aspect of the invention is that the piston and the piston rod are separate from one another and each of them is actuated separately by their respective elastic means, for example a reset spring, which pushes them in their direction of extraction from the cylinder.

In this way it is possible to differently calibrate the force of the reset springs appropriately, so that the extraction of the rod acting as pusher occurs quickly and/or with the function of extractor, while the movement of the piston can follow more slowly, permitting the fluid contained in the cylinder, for example, viscous oil, to flow through the means present in it for the calibrated passage.

In the opposite movement, of introduction into the cylinder, the device functions instead in the usual way as a decelerator, as the speed of the viscous fluid, which flows in the calibrated passage of the piston, is the element that determines the braking action, to which the contrast exercised by the reset spring is also added.

The opening and closing method of the moving part of a cabinet, for example a door or a draw, with a decelerating device compliant to the invention combined with a known closing device, has numerous advantages.

The closing device actually creates a push on the moving part of the cabinet in its closing direction, which is braked by the decelerating device according to the invention in its first direction of travel.

It is possible to arrange that subsequently, due to an external force, the closing device is neutralised or deactivated, when, that is, one wishes to open the moving part of the cabinet. In this case, the same decelerating device, according to the invention, exercises a force in the opposite direction to the first, creating a push that generates or facilitates the opening of the same moving part of the cabinet.

Other characteristics of the his invention are also described in the claims that follow.

BRIEF DESCRIPTION OF THE DRAWINGS

Further characteristics and advantages of the invention are clearer from a description of a preferred, but not exclusive application of the decelerating device, according to the invention, illustrated by way of example, but not limited to such, in the attached drawings, in which.

DESCRIPTION OF THE PREFERRED EMBODIMENT

Figure 1:
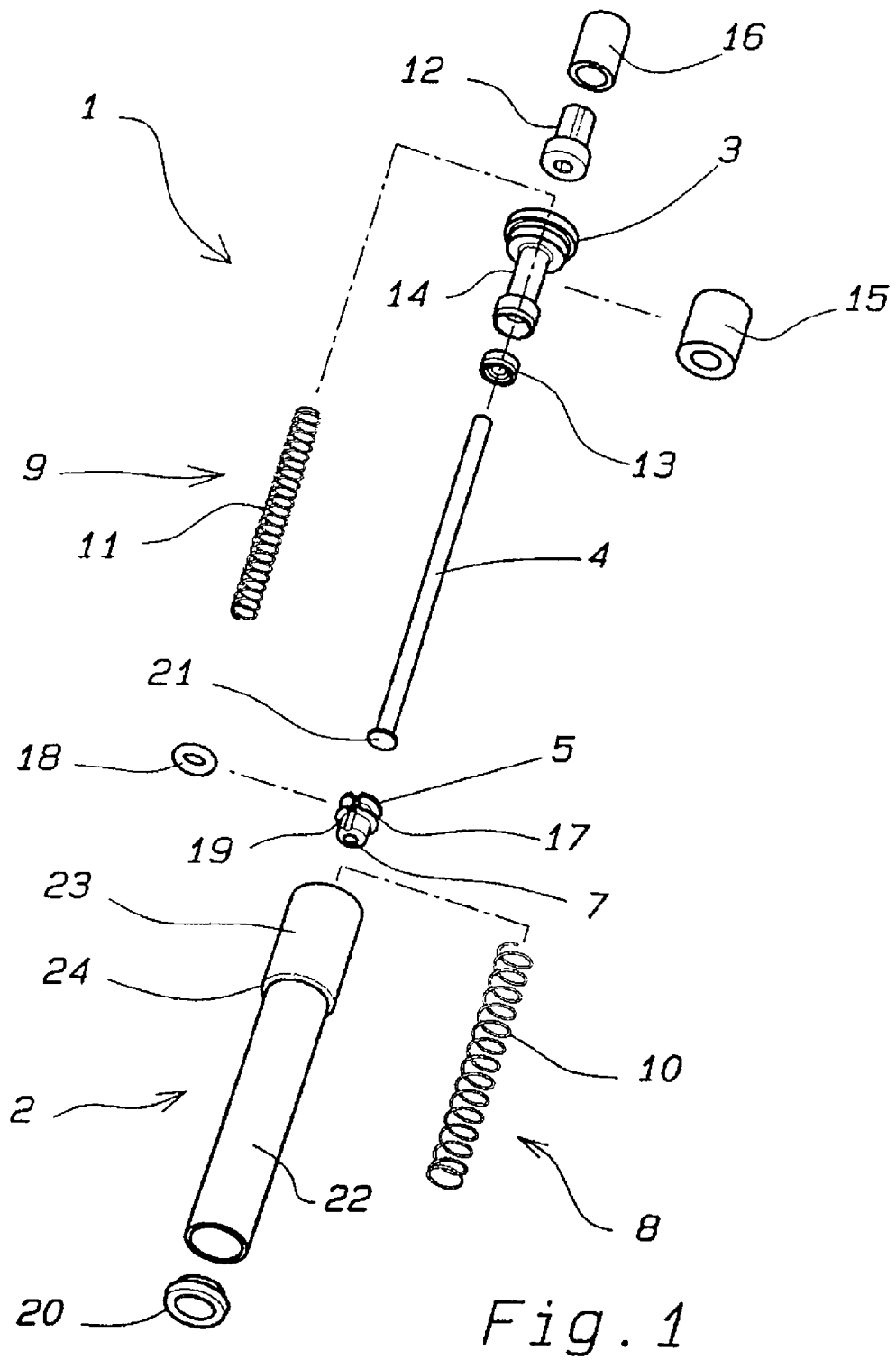
FIG. 1 shows a perspective view of an exploded view of the parts comprising the decelerating device.

With reference to the cited figures, a decelerating device indicated as a whole with reference number 1.

The decelerating device comprises a cylinder 2 filled with a viscous fluid, a bushing 3 for the closure of the cylinder 2, traversed by a rod 4 sliding in the cylinder 2, and a piston 5 separated from the rod 4.

The viscous fluid that fills the cylinder 2 may be gaseous, for example air, or liquid, for example oil, as in this case.

The piston 5 slides in the cylinder 2 and provides a calibrated through passage 7 for the viscous fluid.

The decelerating device 1 advantageously has first elastic means 8, for the movement of the piston 5 in the direction of extraction from the cylinder 2 and second elastic means 9, independent of the first elastic means, for the movement of the rod 4 in the direction of extraction from the cylinder 2.

The first elastic means 8 comprise a first reset spring 10 held between a rear step 19 of the piston 5 and a cap 20 closing the bottom of the cylinder.

The second elastic means 9 comprises a second spring 11 fitted over the rod 4 externally to the cylinder 2 and held between the front head of the rod 4 and the front end of the bushing 3.

The first and second reset springs 10 and 11 are preferably helical compression springs coaxial with the cylinder 2 and preferably have different degrees of stiffness.

The front head 12 of the rod 4 has an elastic cap 16 to deaden noise due to impacts.

Rod 4 has a rear head 21 for resting on the front surface of the piston 5, which in an annular perimeter groove 17 is fitted with an O-ring 18.

The hermetic seal between the bushing 3 and the rod 4 is assured by a lip seal 13.

A tubular element 15 in a compressible elastic material surrounds a leg 14 of restricted diameter of the bushing 3.

Figures 2, 3, 4:
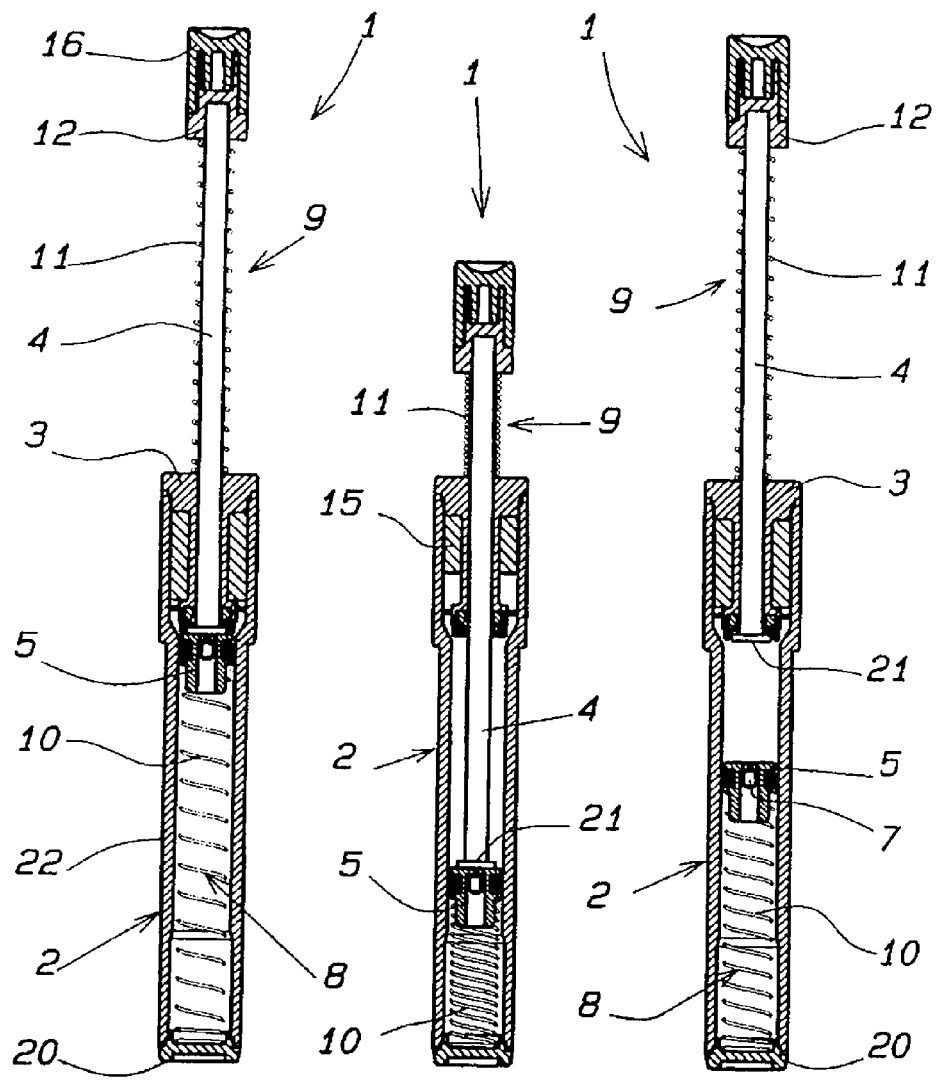
FIG. 2 shows an axial section of the device of FIG. 1 in which the rod is in a protracted position.
FIG. 3 shows an axial section of the device of FIG. 1 in which the rod is in a retracted position.
FIG. 4 shows an axial section of the device of FIG. 1 in which the rod is in an intermediate position during its protraction.

The tubular element 15, is comprised for example of closed-cell rubber sleeve, which compresses when rod 4 withdraws and the viscous fluid flows towards the front part of the cylinder 2 (FIG. 2).

More specifically, cylinder 2 has a rear section 22 of a smaller diameter, a front section 23 of a larger diameter, and an intermediate section 24 joining the rear section 22 and the front section 23.

The rear section 22 of the cylinder guides the axial sliding of the piston 5. The O-ring 18 provides the seal between the internal surface of the front section 22 of the cylinder 2 and the piston 5.

The front section 23 of the cylinder 2 houses the bushing 3 with its leg 14 and the tubular element 15 sustained by the same.

The functioning of the decelerating device 1 according to the invention is evident from the above description and illustration and, in particular, is the following.

Starting from the protracted position of the rod 4 shown in FIG. 2, during the retraction of the rod 4, the first reset spring hold the piston 5 in contact with the rear head of the rod 4. Both the first reset spring 10 and the second reset spring 11 compress, working with the piston 5 to decelerate the retraction stroke of the rod 4.

At the end of the retraction, the rod 4 assumes the configuration illustrated in FIG. 3.

FIG. 4 shows the decelerating device 1 during the subsequent extraction of the rod 4, in which the second reset spring 11 has already concluded the extraction of the rod 4, whose movement in the cylinder is not braked, while the first reset spring 10 continues the extractive push on piston 5, which moves in cylinder 2 more slowly due to the viscous fluid present in the same which flows through the calibrated passage 7. Piston 5 therefore terminates its extraction stroke by coming to rest on the rear head 21 of rod 4 (position illustrated in FIG. 2) with a delay with respect to the end of the extractive stroke of rod 4.

Functioning in this way, decelerating device 1 can advantageously be combined with a known closure device with which the extremely smooth and silent opening and closing of the moving part of a cabinet can be achieved.

In practice, during the closing of the moving part of the cabinet, both the first elastic means 8 and the second elastic means 9 are active and work with the piston (5) to decelerate the rod 4 and consequently the moving part of the cabinet, while during the opening of the moving part of the cabinet, the second elastic means are active to rapidly push only rod 4 in the direction of extraction, while the first means 8 are active to push only rod 5 in the direction of extraction from cylinder 2, this permitting its slower movement due to the flow of the viscous fluid through the calibrated passage 7.

A wide number of changes and variants can be applied to the decelerating device conceived in this way, all of which covered by the scope of the inventive concept; furthermore, all details can be replaced with technically-equivalent elements.

In practice, the materials used, as well as the dimensions, could be adapted to the needs and the state of the art.

The invention claimed is:

1. Decelerating device (1) comprised of a cylinder (2) having a closed bottom and filled with a fluid, a bushing (3) for the closure of a top of said cylinder (2) and traversed by a rod (4) sliding in said cylinder (2), and a piston (5) sliding inside said cylinder (2) and fitted with means (7) for the calibrated through passage of said fluid, said decelerating device characterized in that said piston (5) is an element separated from said rod (4), said rod (4) having a rear head (21) for resting on said piston (5), and there are first elastic means (8) for biasing the movement of said piston (5) in the direction of extraction of said rod from said cylinder (2) and second elastic means (9) independent of said first elastic means (8) for biasing the movement of said rod (4) in the direction of extraction of said rod from said cylinder (2), said rod (4) being freely movable in said cylinder (2) and actuated only by said second elastic means (9) during the extraction stroke, independently of said piston (5) and said first elastic means (8) acting on said piston (5).

2. Decelerating device (1) according to claim 1, characterized in that said first elastic means (8) are comprised of a first spring (10) held between said piston (5) and the bottom of said cylinder (2).

3. Decelerating device (1) according to claim 2, characterized in that said second elastic means (9) comprise a second spring (11) fitted over said rod (4) externally to said cylinder (2) and held between a front head (12) of said rod (4) and said cylinder (2) or said bushing (3).

4. Decelerating device (1) according to claim 3, characterized in that said first and second springs (10, 11) have a different degree of stiffness.

5. Decelerating device (1) according to claim 3, characterized in that said first and second spring (10, 11) are helical springs coaxial with said cylinder (2).

6. Decelerating device (1) according to claim 1, characterised in that said rod (4) is fitted with a front head (12) which has an elastic cap (16) to deaden noise due to impacts.

7. Decelerating device (1) according to claim 1, characterized in that said piston (5) includes an annular perimeter groove (17) fitted with an O-ring (18) and is guided axially along the cylinder (2).

8. Cabinet characterized in that it has a decelerating device (1) consistent with claim 1, for the decelerated closure of a moving part of the cabinet.

9. Method of opening and closing a moving part of a cabinet by means of a decelerating device (1) comprised of a cylinder (2) filled with a viscous fluid, a bushing (3) for the closure of said cylinder (2) and traversed by a rod (4) sliding in said cylinder (2), and a piston (5) that is an element separated from said rod (4), said rod (4) having a rear head (21) for resting on said piston (5), said piston (5) sliding inside said cylinder (2) and fitted with means (7) for calibrated through passage of said viscous fluid, the method characterized in that it includes the steps of:
closing said moving part, during closure of the said moving part of the cabinet first elastic means (8) for moving said piston (5) in the direction of extraction of said rod from said cylinder are active to decelerate said rod (4) in cooperation with second elastic means (9) for moving said rod (4) in the direction of extraction of said rod from said cylinder (2), opening said moving part, during opening of said moving part of the cabinet said second elastic means (9) are active to push only in the direction of extraction of said rod (4), while said first elastic means (8) are active to push said piston (5) in the direction of extraction of said rod from said cylinder (2), and allowing the flow of said viscous fluid through said means (7) for its calibrated passage, said rod (4) being freely movable in said cylinder (2) and actuated only by said second elastic means (9) during the extraction stroke, independently of said piston (5) and said first elastic means (8) acting on said piston (5).

\* \* \* \* \*